Oct. 14, 1924.  
F. F. SKELLY  
FLYTRAP  
Filed Jan. 25, 1921  
1,511,682  
2 Sheets-Sheet 1
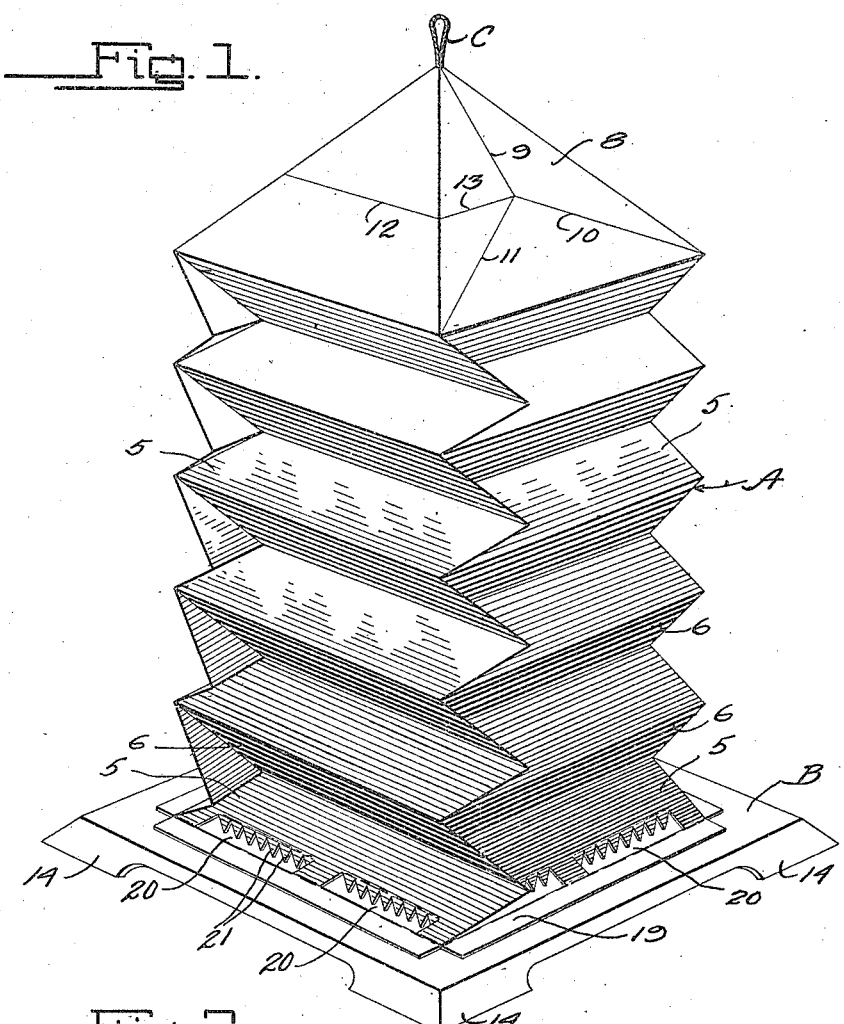
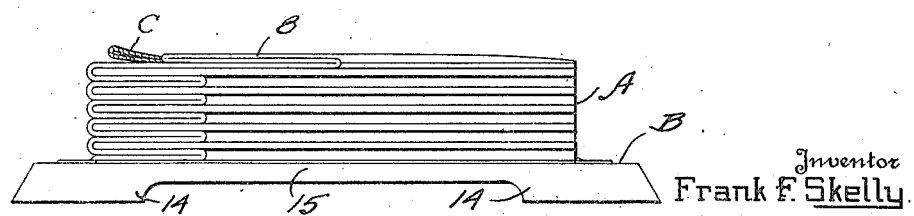
Inventor  
Frank F. Skelly.  
By Lancaster and Allwine  
Attorneys Oct. 14, 1924.  
F. F. SKELLY  
FLYTRAP  
Filed Jan. 25, 1921  
1,511,682.
2 Sheets-Sheet 2
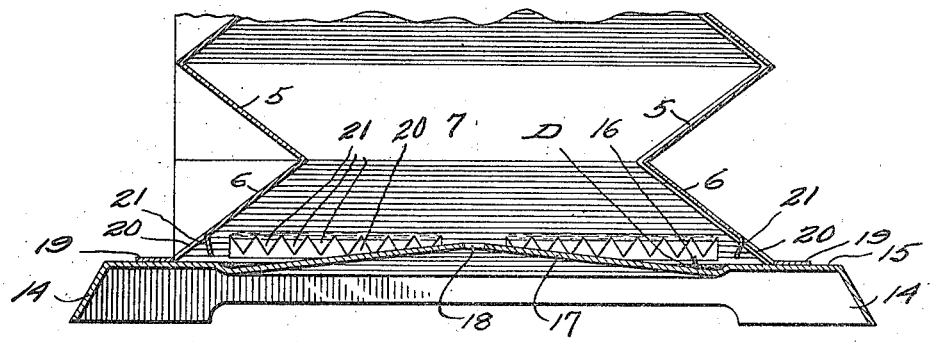
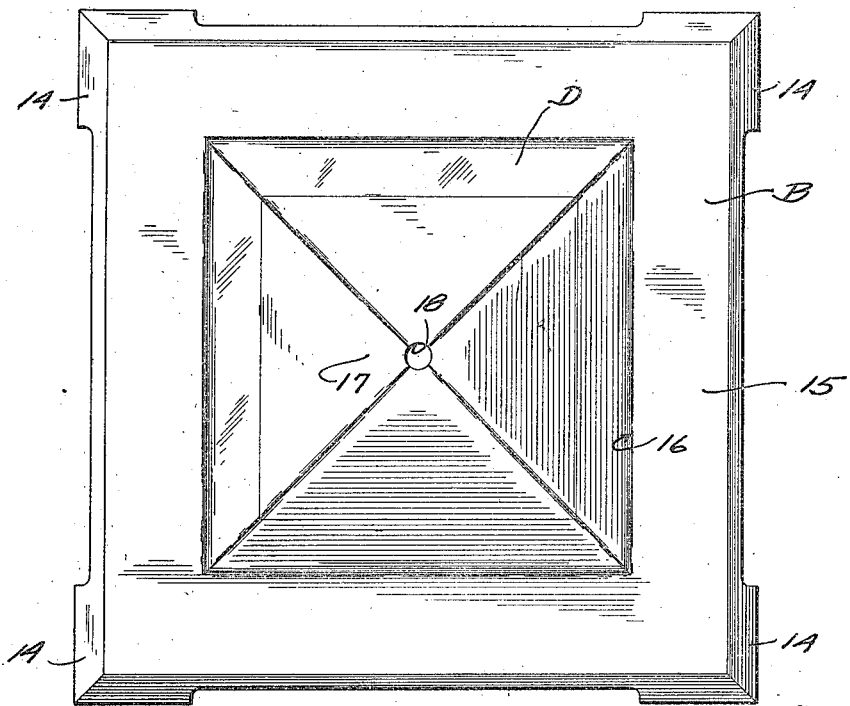
Inventor  
Frank F. Skelly  
By Lancaster & Allwine  
Attorneys Patented Oct. 14, 1924.

1,511,682

UNITED STATES PATENT OFFICE.

FRANK F. SKELLY, OF RAMONA, CALIFORNIA.

FLYTRAP.

Application filed January 25, 1921. Serial No. 439,876.

*To all whom it may concern:*

Be it known that I, FRANK F. SKELLY, a citizen of the United States, residing at Ramona, in the county of San Diego and State of California, have invented certain new and useful Improvements in Flytraps, of which the following is a specification.

My present invention relates to traps and more particularly to that class adapted to lure and catch flies.

The principal objects of my invention are, to provide fly traps which may be made of inexpensive material, such as paper; easily manufactured so as to be vended at a low price such as to justify the burning of the traps and their contents when a sufficient number of flies have been trapped and thus effectively destroy such pests; and which may be compactly folded for shipment and storage when not in use.

A further object of the invention is to provide fly traps which are attractive in appearance as to outline so that they may be used in places where an ordinary trap would be undesirable from an aesthetic standpoint, such as in the living room, or dining room of a residence or in shops, hotels, hospitals etc., and which may be decorated in a manner to add to the attractiveness of the traps and also increase their efficiency by luring the flies to a portion where escape is impossible.

A further object of the invention is to provide traps which may be disposed on a flat surface, such as a table or shelf, or which may be suspended from the ceiling or other object when in use.

Other objects and advantages of the invention will appear in the following detailed description taken in connection with the accompanying drawings, forming a part of this specification, and in which drawings:

Figure 1 is a perspective view of a fly trap constructed according to my invention.

Fig. 2 is a side elevation of the trap collapsed or folded.

Fig. 3 is a fragmentary detail view in vertical section through the lower portion of the trap.

Fig. 4 is a plan view of the base of the trap.

In the drawings where similar characters of reference refer to similar parts throughout the views A designates the main body portion or housing of the trap, B the base thereof, C a device to facilitate the suspending of the trap by a cord or wire, and D a lure in the body A, which may be of the nature to stupefy or to poison the flies.

Referring first to the main body portion or housing A, it is preferably made of paper or other flexible material, in order that it may be manufactured at a low cost, such as to justify destruction of the trap and the flies entrapped by fire. It is therefore desirable that this main body portion or housing be of inflammable material. For the dual purpose of making the trap readily collapsible for shipment and storage when not in use, and to also provide roosts on the interior of the housing, for the flies, this main body portion or housing is, in the example shown, of accordion-like formation. This may be accomplished by crimping the material from which the housing is made, or arranging it in folds indicated at 5 and 6, like the sides of a bellows or an accordion, the inner sides of the folds 6 serving as roosts for the flies about a central space 7 indicated in Figure 3 of the drawings on the interior of the main body portion or housing. These roosts are similar to ledges or shelves upon which the flies may rest after entering the trap and after partaking of the lure, which may tend to stupefy the flies. Resting on these roosts, after becoming exhausted, the flies are out of the way of those entering the trap and flying about in the central portion 7 in an effort to escape. The top of the main body portion or housing A may be closed in any suitable manner, but in the example shown is provided with a pyramid like top 8, which may be compactly folded, by creasing the material from which it is formed on the lines indicated by characters 9, 10, 11 and 12 which indicate that the material is to be bent inwardly, and the line 13 indicating that the material is to be bent outwardly, so that this top 8 will lie closely adjacent the collapsed side-wall portion, as indicated in Figure 2 of the drawings.

As to the base B, in order that the trap may be used either resting upon a horizontal surface, such as a table, or suspended from the ceiling, by a cord or wire, as hereinafter noted, the base B is preferably provided with legs or downwardly extending flanges 14 so as to space the main body portion 15 of the base from the surface on which it is supported. Thus the flies are permitted to crawl beneath the base, when resting on a horizontal surface. This base is preferably made of cardboard or relatively heavy paper, or some other material which is relatively light in weight, and preferably inflammable, so that it may be destroyed with the rest of the trap as hereinbefore noted. This base is provided with a channel 16 adjacent its margin for the reception of the lure D, and may taper upwardly from the channel toward the center of the base which, in the example shown provides a pyramid-like central portion 17 which may be provided with an aperture 18 at its apex, this aperture serving as an entrance for flies to the trap, which have crawled beneath the base, or which fly upwardly into the hollow lower portion of the base. The channel 16 is preferably continuous, and receives the lure D, which may be in the form of a dried paste like material, rendered active as a lure, by moistening.

The main body portion or housing A is secured to the base in any suitable manner,—in the example shown, having its lower marginal portion provided with flaps 19 which are pasted or otherwise secured to the upper portion of the base B. In order to provide entrances for the flies at the base, the folds 5 which incline upwardly and inwardly from the base may be provided with cut away portions 20 and may have depending fingers 21, which constrict, to some extent, these entrances and have a tendency to prevent flies finding exit from the trap to these entrances. It is to be noted that, by providing these entrances in the inclined folds of the body portion A, or in other words, the walls thereof, the base may be made relatively narrow and still provide ample space for flies to alight and crawl into the trap.

The devices C may consist of a cord secured at the apex of the top A, in looped formation, so that the trap may be readily tied to a cord suspended from the ceiling, or receive the hooked portion of a wire. This device C also aids in opening the trap for use, after it has been shipped or stored in collapsed condition.

An important feature of the invention is the treating of the main body portion or housing A so as to permit a greater amount of light to its interior at its upper portion than other portions thereof, so as to lure the flies upwardly where escape is impossible. The main body portion or housing may be rendered more pervious to light at its top than at its lower portion, as by printing, stamping, dyeing, or otherwise treating the material from which the main body portion or housing is formed in a manner that it is darker at its lower portion than at its upper portion. This treatment of the main body portion or housing may also be used to ornament the article of manufacture, so as to have a pleasing appearance, but the prime function of so treating the material is to render the upper portion more pervious to light than the lower portion, so that after the flies have entered the trap at the base, and have partaken of the lure at the base, then will fly upwardly and finally alight on one of the roosts provided within the housing.

It is to be observed that a trap of this kind is very sanitary, due to the fact that flies seeking to escape are not exposed to view but are entirely enclosed by the upper portion of the housing and particles agitated by their flying cannot readily pass into the air outside of the trap. As a matter of fact, the lure if moistened, in order to be rendered active, will serve to catch particles dropping to the base. The lure may be readily moistened by pouring a small quantity of water into the channel from the entrances 20, and by slightly tilting the base, this water will flow about the channel and thoroughly moisten the lure.

After a sufficient number of flies have been caught in the trap, to warrant its destruction, it may be readily burnt by throwing the trap into a stove or furnace, the entire trap and contents to be destroyed by the flames.

Changes in details may be made without departing from the spirit or scope of my invention; but,

I claim:

1. A fly trap comprising in combination, a base and an imperforate dome-like housing having entrances for flies at said base and roosts extending inwardly from the walls of the housing about a central space for flying.

2. A fly trap comprising in combination, a base and a housing closed at its upper portion, having entrances for flies at said base and roosts extending inwardly from the walls of the housing about a central space for flying, said housing treated to permit a greater amount of light to its interior at its upper portion than other portions thereof to lure the flies upwardly.

3. A fly trap comprising a base having an annularly extending lure receiving channel in spaced relation to its periphery, and a housing having its walls secured upon said base in spaced relation to the channel and the periphery of the base to position the lure receiving channel well within the housing, said housing having its walls provided with entrance passages at the base.

4. A fly trap comprising in combination, a base having a continuous channel extending adjacent its margin and tapering upwardly from said channel toward the center of the base, and provided with a fly entrance at the apex of said tapered portion, a housing above said base said housing provided with fly entrances adjacent said channel, and a lure in said channel.

5. A fly trap comprising in combination, a collapsible imperforate main body portion closed at its upper end and having a base at the lower end with entrances for the flies at said base, the walls of the body being crimped transversely to provide roosting ledges within the housing.

6. A fly trap comprising in combination, a collapsible accordion-like main body portion closed at its upper end and having a base at the lower end with entrances for the flies at said base, said main body portion treated to be more pervious to light at its top than at its lower portion to lure the flies upwardly.

7. In a fly trap, the combination, of a base, and a housing secured to said base adjacent its margin, said housing having a wall portion extending directly from said base inclined inwardly and upwardly therefrom, the lower portion of the wall being cut to provide an entrance at the base and depending guard tongues partially closing the entrance at said base provided by a cut away portion of the wall.

8. In a fly trap, the combination, of a base, and a housing secured to said base adjacent its margin, said housing having a wall portion extending directly from said base inclined inwardly and upwardly therefrom, and provided with an entrance at said base provided by a cut away portion of the wall, and fingers depending in a vertical plane from said cutaway portion to constrict the entrance.

FRANK F. SKELLY.